United States Patent [19]
Leach

[11] 3,907,982

[45] Sept. 23, 1975

[54] CALCINING METHOD FOR ALUMINA

[75] Inventor: Bruce E. Leach, Ponca City, Okla.

[73] Assignee: Continental Oil Company, Ponca City, Okla.

[22] Filed: May 31, 1973

[21] Appl. No.: 364,837

[52] U.S. Cl. ............... 423/630; 423/625; 423/628; 252/463
[51] Int. Cl. ............................................. C01f 7/02
[58] Field of Search.................. 423/628, 630, 625; 252/463

[56] References Cited
UNITED STATES PATENTS

| | | | |
|---|---|---|---|
| 2,015,593 | 9/1935 | Derr............................ | 423/628 UX |
| 3,394,990 | 7/1968 | Weingaertner et al............. | 423/625 |
| 3,419,352 | 12/1968 | Acciani.............................. | 423/630 |
| 3,577,353 | 5/1971 | White................................ | 252/465 |
| 3,647,374 | 3/1972 | Nomura et al...................... | 423/630 |

Primary Examiner—Herbert T. Carter
Attorney, Agent, or Firm—F. Lindsey Scott

[57] ABSTRACT

Alumina having improved color characteristics and improved extrusion properties is produced by an improvement in the process for producing low-density, high-porosity, high-surface area alumina from an aqueous alumina slurry by contacting said aqueous alumina slurry with an effective amount of an organic solvent to form a solvent-aqueous alumina mixture; drying said mixture and recovering said low-density, high-porosity, high-surface area alumina; comprising drying said solvent-aqueous alumina mixture in an atmosphere containing at least 0.5 volume percent carbon dioxide.

8 Claims, No Drawings

CALCINING METHOD FOR ALUMINA

FIELD OF THE INVENTION

This invention relates to processes for the production of alumina. This invention further relates to processes for the production of low-density, high-porosity, high-surface area alumina. This invention further relates to an improvement in such processes whereby alumina having improved color characteristics and improved extrusion properties is obtained.

PRIOR ART

Numerous processes such as the water hydrolysis of aluminum alkoxide, the alum process and sodium aluminate processes are known for the production of aluminum. Such alumina has a variety of uses such as for catalysts, catalyst supports and the like. In many of these applications the usefulness of the alumina is directly related to the pore volume, surface area and density. Generally, lighter alumina having low-bulk density, high-surface area and high-porosity is more desirable. Most processes produce alumina having loose bulk densities greater than about 35 lb/ft$^3$, a pore volume of less than about 1 cubic centimeter per gram (cc/g) and surface areas lower than about 275 square meters per gram (m$^2$/g). Recently it has been discovered that alumina slurries produced by the water hydrolysis of aluminum alkoxide, may be contacted with an effective amount of an organic solvent to form a solvent-aqueous alumina mixture and azeotropically dried to produce an alumina having a loose bulk density from about 7.5 to about 25 lb/ft$^3$, a surface area from about 275 to about 400 m$^2$/g and a pore volume of from about 1 to about 2.75 cc/g. Such alumina is very desirable in catalytic applications and the like. The alumina so produced frequently has a substantial amount of residual carbon contamination as a result of the various production process steps and the like. Substantial amounts of the residual carbon material can be removed by steam contacting as shown in U.S. Pat. No. 3,773,691, entitled "Removal of Residual Carbon Contaminants from Alumina," issued Nov. 20, 1973, to Leach. Although substantial amounts of the residual carbon can be removed by the steam contacting operation trace amounts of the residual carbon apparently remain on the alumina. Upon calcining the remaining residual carbon causes discoloration of the alumina product, results in the formation of odorous components associated with the alumina product and results in an alumina product having inferior extrudability. Accordingly, a method was sought whereby the discoloration, formation of odorous compounds and loss of extrudable properties could be prevented.

In a prior art search conducted on the concept of the present invention, the following references were discovered: U.S. Pat. No. 2,889,268 to Dinwiddie; U.S. Pat. No. 2,749,216 to Dinwiddie; U.S. Pat. No. 2,970,891 to Hinlicky; U.S. Pat. No. 3,394,990 to Weingaertner; U.S. Pat. No. 3,480,389 to Graulier; U.S. Pat. No. 2,903,418 to Kirschenbaum; U.S. Pat. No. 3,042,628 to Cramer; U.S. Pat. No. 3,220,797 to Lester; U.S. Pat. No. 3,416,888 to Notari; U.S. Pat. No. 3,297,414 to Mazdiyasni. The references cited are illustrative of the state of the art.

OBJECTS OF THE INVENTION

It is an object of the present invention to provide an improved process for the production of high-porosity, high-surface area, low-bulk density alumina. It is a further objective of the present invention to provide an improved process for the production of high-surface area, high-porosity, low-bulk density alumina having improved color characteristics and improved extrusion properties.

SUMMARY OF THE INVENTION

The objectives of the present invention are accomplished in a process for producing low-density, high-porosity, high-surface area alumina from an aqueous alumina slurry produced by the water hydrolysis of aluminum alkoxides by contacting said aqueous alumina slurry with an effective amount of an organic solvent having a lower surface tension than water to form a solvent-aqueous alumina mixture; azeotropically drying said mixture and recovering said low-density, high-porosity, high-surface area alumina by an improvement comprising calcining said alumina in an atmosphere containing at least 0.5 volume percent carbon dioxide and recovering said low-density, high-porosity, high-surface area alumina having improved color and extrusion properties.

DESCRIPTION OF PREFERRED EMBODIMENTS

Alumina is generally useful for a variety of catalytic and refractory applications. Low-bulk density, high-porosity, high-surface area alumina is especially useful in catalytic applications such as chemical process catalysts and catalyst supports, catalyst linings for mufflers and the like. Such alumina has been produced by a process comprising contacting aqueous alumina slurries containing up to about 32 weight percent $Al_2O_3$ produced by the water hydrolysis of aluminum alkoxides, with an effective amount of an organic solvent having a lower surface tension than water such as ethanol, propanol, isopropanol, butanol, isobutanol and tertiary butanol and the like to form a solvent-aqueous alumina mixture, azeotropically drying said mixture and recovering low-density, high-porosity, high-surface area alumina. Such processes frequently result in an alumina product having desirable properites but containing high levels of residual carbon contamination. Such a process is more fully shown in U.S. Ser. No. 191,085 filed Oct. 20, 1971, entitled "High-Porosity, High-Surface Area, Low-Bulk Density Alumina" by W. C. Ziegenhain. One method for reducing the residual carbon levels comprises contacting the alumina so produced with an effective amount of superheated steam as more fully described in U.S. Pat. No. 3,773,691, issued Nov. 20, 1973, entitled "Removal of Residual Carbon Contaminants from Alumina" to Leach.

Residual carbon as used herein includes carbonnaceous compounds generally since such residual compounds are typically reported as residual carbon.

Alumina as used herein refers to an apparently dry material which may contain in addition to $Al_2O_3$, associated water of hydration, free water and the like. The degree of drying is hereinafter designated by the weight percent $Al_2O_3$.

The aqueous alumina slurry produced by the water hydrolysis of alumina alkoxides is produced by a process comprising;

a. contacting aluminum alkoxides, such as those produced by the Ziegler process with an effective amount of water to produce an organic reaction product and an aqueous alumina slurry.

b. separating the aqueous alumina slurry from the organic reaction product which comprises primarily alcohols and any organic diluent which may have been present in the aluminum alkoxide charge to the reaction zone.

The separation of the organic reaction product and the aqueous alumina slurry can be achieved in a variety of ways such as by gravimetric separations, solvent extractions, steam stripping and the like. One such process comprises:

a. gravimetrically separating the organic reaction product and the aqueous alumina slurry;

b. thereafter contacting the aqueous alumina slurry with a suitable organic solvent such as butanol and thereafter gravimetrically separating the organic solvent from the aqueous alumina thereby reducing the quantity of alcohol remaining with the aqueous alumina; and, c. thereafter steam stripping the aqueous alumina slurry to further reduce the quantity of alcohol remaining with the aqueous alumina slurry.

It should be noted that the stem contacting of the aqueous alumina slurry described above is not the same as the subsequent contacting of the semi-dried alumina product with superheated steam i.e., after forming the organic solvent-aqueous alumina mixture and azeotropically drying, the alumina is contacted with superheated steam prior to calcining.

It has been found that when the starting aqueous alumina slurry is formed by the process described above it is desirable that air be present in the calcining operation, but when no steam stripping is used in the preparation of the aqueous alumina slurry it is necessary that an inert atmosphere be used in the calcining operation. When air is used in calcining alumina produced from such non-steam stripped aqueous alumina slurries the alumina product is discolored, odorous and extrudes poorly. Early attempts to solve this problem included the use of additional amounts of air and oxygen-enriched air. Such attempts increased the discoloration, odor and difficulty in extrusion.

No completely satisfactory explanation for the desirable color, lack of odor and good extrudability obtained when an inert atmosphere is used is now known to Applicant. While Applicant does not wish to be bound by any particular theory it is hypothesized that the heavier alcohols are substantially removed from the aqueous alumina slurry during steam stripping and that the lighter organic solvents admixed with the aqueous alumina subsequently which remain with the alumina as charged to the calciner in trace amounts are readily oxidized or vaporized and thus removed by the calcining in air. By contrast when no steam stripping is used with the aqueous alumina slurry greater amounts of the heavier alcohols remain with the alumina as charged to the calciner. Such alcohols are not readily vaporized or oxidized to volatile components but rather form colored odorous compounds. Much higher temperatures are required to vaporize such materials and as shown hereinafter such temperatures are detrimental to the product alumina. It is further postulated that such alcohols while not subject to vaporization and oxidation are subject to thermal cracking on the alumina to volatile, colorless, odorless compounds thus explaining the surprising improvement achieved when an inert atmosphere is used. It is again noted that applicants do not wish to be bound by any particular theory and to date no satisfactory explanation for this highly desirable result has been documented experimentally.

Certain advantages are obtained by omitting the steam stripping step. For instance the alumina is "aged" at an accelerated rate when subjected to the higher temperatures involved in the steam stripping operation. Such "aging" is evidenced primarily by accelerated growth of the alumina crystallite size. "Aged" alumina slurries are also less suitable for subsequent contacting with solvent and azeotropic drying to produce high-pore volume, high-surface area, low-bulk density alumina. In particular slightly higher bulk densities are obtained, and slightly lower pore volumes and surface areas are obtained. It has been found that the discoloration, formation of odorous compounds and the like can be avoided by carrying out the drying operations in an inert atmosphere when the aqueous alumina slurry has been prepared without the use of steam stripping. The inert atmosphere may consist of any suitable gaseous compound which does not contain free oxygen. Some examples of such gaseous material are nitrogen, argon, helium, hydrogen, carbon monoxide, superheated steam and mixtures of superheated steam and hydrocarbon compounds containing up to about 30 carbon atoms.

The drying may be carried out by several methods. The first and most obvious method is to dry the solvent-aqueous alumina mixture directly to the $Al_2O_3$ concentration desired. In this method it will be found that a suitable inert atmosphere may be generated from the solvent-aqueous alumina mixture itself, i.e., upon heating, water and solvent vapors are evolved and unless removed serve as an inert atmosphere which prevents the formation of the discoloration and the like at higher temperatures.

A second method involves drying the solvent-aqueous alumina mixture to form a mixture containing from about 65 to about 75 weight percent $Al_2O_3$ and thereafter further drying the mixture to form an alumina product having the desired $Al_2O_3$ concentration. By this method the vapors generated during the first drying stage are suitable for solvent recovery and recycle. The alumina subjected to further drying still retains sufficient water and organic solvent to generate an inert atmosphere and thus prevent discoloration and the like during the remaining drying steps.

Both the above methods will be found more useful when ethanol, propanol, isopropanol and the like are used as an organic solvent. When butanol, isobutanol, tertiary butanol and the like are used the residual carbon levels are higher, although desirable alumina is obtained. A preferred method for use with the heavier solvents is set out below.

In a third method the solvent-aqueous alumina slurry is dried to form a product containing from about 65 to about 75 weight percent $Al_2O_3$, the product from the first drying operation is then contacted with superheated steam to remove and recover hydrocarbons and further dried to about 81 weight percent alumina and thereafter calcined to from about 85 to about 95 weight percent alumina. It is necessary that an inert atmosphere be supplied by an inert gas purge and the like during the final calcining operation.

In a preferred embodiment the calcining is achieved by a. heating the solvent-aqueous alumina mixture to about 300°F for at least about 1 hour to obtain a partially dried product alumina containing from about 70 to about 76 weight percent $Al_2O_3$;
b. heating to about 300°F and simultaneously contacting the partially dried product with superheated steam for at least about 1 minute to obtain a semi-dry product alumina containing from about 79 to about 82 weight percent $Al_2O_3$;
c. calcining the semi-dry product alumina to about 800°F for at least about 4 minutes in the presence of an inert atmosphere to obtain a product alumina containing from about 86 to about 90 weight percent $Al_2O_3$ and thereafter
d. cooling to at least about 300°F in the presence of an inert atmosphere to obtain low-density, high-porosity, high surface area alumina containing from about 86 to about 90 weight percent $Al_2O_3$ and having desirable color characteristics and desirable extrusion properties.

It has been found that when alumina is heated above about 350°F in the presence of free oxygen containing gases with the residual carbon present, discoloration begins to occur. Accordingly, during calcining operations which involve temperatures higher than about 350°F, it is necessary that the inert atmosphere be supplied and maintained until the alumina is cooled to below about 300°F and preferably below about 200°F. By this technique it has been discovered that discoloration, formation of odorous compounds and the like is readily avoided.

The alumina may be extruded by any suitable method. Some suitable extrusion techniques are set forth more fully in U.S. Ser. No. 168,420, entitled, "Low-Density, High-Porosity Alumina Extrudates and a Method for Producing Said Extrudates," filed Aug. 2, 1971 by Leach et al., U.S. Ser. No. 191,091, entitled, "Low-Density, High-Porosity Alumina Extrudates and a Method for Producing Said Extrudates," filed Oct. 20, 1971 by Leach et al. and U.S. Ser. No. 268,246, a continuation-in-part based on the two cases noted hereinbefore of the same title filed Jul. 3, 1972 by Leach et al. Especially desirable extrudates are obtained when the alumina starting material is dried or calcined to an $Al_2O_3$ content from about 77 to about 97 weight percent $Al_2O_3$. Such properties are lost to a significant degree when discoloration of the alumina and the formation of the odorous bodies occurs. Accordingly, a further advantage is realized in such processes by the improvement of the present invention in that desirable extrusion properties are retained.

An alumina product having reduced discoloration can be obtained by calcining to higher temperatures, i.e. in excess of 1,200°F, in the presence of oxygen, but as a result the alumina product is typically 100 weight percent $Al_2O_3$ and as a result is less desirable for certain uses. In particular, the alumina marketed for use in the production of catalysts and the like is usually required to be in an uncalcined state, i.e., contain from about 65 to about 97 weight percent $Al_2O_3$. The calcining step is then performed by the catalyst manufacturer by a method of his choosing in light of the desired catalyst properties and the like. The extrusion properties are degraded by severe calcining, i.e., above about 1,000°F for a substantial length of time, thus it is desirable that the discoloration and the like be avoided, as by the improvement of the present invention in a manner such that severe calcining is not required.

It has now been found that the presence of at least 0.5 volume percent carbon dioxide in the atmosphere in the calciner has the effect of surprisingly and unexpectedly improving the properties of the extrudates produced from the alumina product. In particular higher pore volume extrudates are produced.

When the aqueous alumina slurry has been produced without the use of steam stripping the atmosphere consists of an inert atmosphere comprising gases such as nitrogen, argon, helium, hydrogen, carbon monoxide, superheated steam, mixtures of superheated steam and hydrocarbon compounds containing up to about 30 carbon atoms and the like wherein said inert atmosphere contains at least 0.5 volume percent carbon dioxide.

When the aqueous alumina slurry has been steam stripped the gases noted hereinbefore are suitable for use with at least 0.5 volume percent carbon dioxide and air is also suitable as the atmosphere in conjunction with which the carbon dioxide is used. In fact air is the preferred gas when no steam stripping is used in the preparation of the aqueous alumina slurry.

It is necessary that the carbon dioxide content of the atmosphere be at least 0.5 volume percent although desirable results have been obtained when from about 1.0 to about 20.0 volume percent carbon dioxide was used and a preferred range is from about 1 to 8 percent carbon dioxide. There does not appear to be any reduction in the desirable properties achieved when more than 20 volume percent $CO_2$ is used although economics would indicate that no more than necessary be used.

When air is used, carbon dioxide is present in the air charged to the calciner in an amount of 0.033 volume percent typically. It is necessary that carbon dioxide be added to the air or a suitable residence time in the calciner provided so that the carbon dioxide content is raised to at least 0.5 volume percent and preferably at least 1.0 volume percent. As will be noted in th examples shown hereinafter it is necessary that the atmosphere in the calciner contain at least 0.5 and preferably 1.0 volume percent carbon dioxide.

Many variations and modifications are possible within the scope of the present invention and indeed such modifications and variations may appear obvious or desirable to those skilled in the art based upon the foregoing description of preferred embodiments and the appended examples and the claims.

EXAMPLE 1

Alumina produced by a process comprising
a. hydrolyzing aluminum alkoxides produced by the Ziegler process with water to form an organic reaction product and an aqueous alumina slurry
b. gravimetrically separating the aqueous alumina slurry from the organic reaction product
c. mixing the aqueous alumina slurry with water-saturated n-butanol and gravimetrically separating the aqueous alumina slurry from the n-butanol
d. repeating step (c) with substantially anhydrous n-butanol
e. steam stripping the aqueous alumina slurry
f. admixing the aqueous alumina slurry with an amount of n-butanol sufficient to azeotropically remove the water present g. drying the mixture to an Al₂O₃ content from about 70 to about 76 weight percent Al₂O₃ and
h. further drying the mixture to about 78.6 weight percent Al₂O₃.

was used in the tests. The alumina samples were calcined at 750°F for 15 minutes in a gas flow of about 100 cc/min. The gas flow was nitrogen containing varying amounts of $CO_2$. The alumina was formed into an extrudable mixture by mixing with 95 parts by weight alumina, 95 parts by weight of 0.3 volume percent aqueous acetic acid followed by 62 parts by weight water which was added during mixing to obtain the desired consistency in the mixture. The mixture was then extruded, dried at 250°F and thereafter calcined at 1000°F for 2 hours in the gaseous mixture. The results are shown below.

Table 1

| CO₂ Volume Percent | cc/g Extrudate Pore Vol. |
|---|---|
| 0 | 1.09 |
| 0.5 | 1.07 |
| 1 | 1.20 |
| 2 | 1.25 |
| 4 | 1.27 |
| 6 | 1.22 |
| 8 | 1.22 |
| 20 | 1.27 |

It is clear that a surprising improvement in the extrudate pore volume is achieved when more than 0.5 volume percent carbon dioxide is present in the calciner atmosphere.

Having thus described the invention, I claim:

1. In a process for producing a low-density, high-porosity, high-surface area product alumina from an aqueous alumina slurry containing up to about 32 weight percent Al₂O₃ and produced by:
   a. hydrolyzing aluminum alkoxides with an effective amount of water to form an organic reaction product and an aqueous alumina slurry; and,
   b. thereafter separating the aqueous alumina slurry from the organic reaction product,
wherein said aqueous alumina slurry is contacted with an organic solvent selected from the group consisting of ethanol, propanol, isopropanol, butanol, isobutanol and tertiary butanol in an amount sufficient to produce a product alumina having a loose bulk density from about 7.5 to about 25 lb/ft³, a surface area from about 275 to about 400 m²/g and a pore volume from about 1 to about 2.75 cc/g, to form a solvent-aqueous alumina mixture; said mixture is dried and said dried alumina is calcined and said product alumina is recovered, the improvement comprising calcining said dried alumina at a temperature in excess of 350°F in an atmosphere containing from about 1.0 to about 20.0 volume percent carbon dioxide in mixture with gases selected from the group consisting of air, nitrogen, argon, helium, hydrogen, carbon monoxide, superheated steam, and mixtures of superheated steam and hydrocarbon compounds containing up to about 30 carbon atoms and mixtures thereof and recovering said product alumina, said product alumina being substantially white and extrudable.

2. The improvement of claim 1 wherein said atmosphere contains from about 1.0 to about 20.0 volume percent carbon dioxide in mixture with gases selected from the group consisting of nitrogen, argon, helium, hydrogen, carbon monoxide, superheated steam, mixtures of superheated steam, and hydrocarbon compounds containing up to about 30 carbon atoms, and mixtures thereof.

3. The improvement of claim 2 wherein said carbon dioxide is present in an amount equal to from about 1 to about 8 volume percent of said atmosphere.

4. The improvement of claim 3 wherein said calcining is controlled to produce an alumina product having an Al₂O₃ content from about 77 to about 97 weight percent Al₂O₃.

5. The improvement of claim 2 wherein said drying is accomplished by:
   a. heating said solvent-aqueous alumina mixture to about 300°F to obtain partially dried alumina containing from about 70 to about 76 weight percent Al₂O₃; and,
   b. heating to about 300°F and simultaneously contacting said partially dried alumina with superheated steam for at least about 1 minute to obtain semi-dry alumina containing from about 70 to about 82 weight percent Al₂O₃;
and wherein said calcining is accomplished by calcining said semi-dry alumina to about 800°F for at least about 4 minutes in the presence of said atmosphere containing from about 1.0 to about 8.0 volume percent carbon dioxide to obtain said product alumina containing from about 86 to about 90 weight percent Al₂O₃; and thereafter cooling to at least about 300°F in the presence of said atmosphere to obtain said product alumina containing from about 86 to about 90 weight percent Al₂O₃.

6. The improvement of claim 2 wherein said aqueous alumina slurry of (b) has been steam stripped.

7. The improvement of claim 6 wherein said gas is air.

8. The improvement of claim 5 wherein said drying is accomplished by:
   a. heating said solvent-aqueous alumina mixture to about 300°F to obtain partially dried alumina containing from about 70 to about 76 weight percent Al₂O₃;
   b. heating to about 300°F and simultaneously contacting said partially dried alumina with superheated steam for at least about 1 minute to obtain semi-dry alumina containing from about 79 to about 82 weight percent Al₂O₃; and,
wherein said calcining is accomplished by calcining said semi-dry alumina to about 800°F for at least about 4 minutes in the presence of said atmosphere containing from about 1.0 to about 8.0 volume percent carbon dioxide to obtain said product alumina containing from about 86 to about 90 weight percent Al₂O₃; and thereafter cooling to at least about 300°F in the presence of said inert atmosphere to obtain said product alumina containing from about 86 to about 90 weight percent Al₂O₃.

* * * * *